United States Patent [19]

Laar

[11] 4,408,091
[45] Oct. 4, 1983

[54] DEVICE AT CABLE ENDS TO SERVE AS A PREPARATION FOR SPLICING

[75] Inventor: Hans Laar, Munich, Fed. Rep. of Germany

[73] Assignee: Siemens Aktiengesellschaft, Berlin & Munich, Fed. Rep. of Germany

[21] Appl. No.: 258,905

[22] Filed: Apr. 30, 1981

[30] Foreign Application Priority Data

May 22, 1980 [DE] Fed. Rep. of Germany ....... 3019640

[51] Int. Cl.³ ........................ H02G 1/14; H02G 15/02
[52] U.S. Cl. ................... 174/74 R; 29/759; 174/72 A; 254/134.3 R
[58] Field of Search ............. 174/72 A, 72 TR, 74 R, 174/112; 339/148, 176 M; 361/428; 29/857

[56] References Cited

U.S. PATENT DOCUMENTS

| 857,367 | 6/1907 | Shore et al. ............ 174/72 TR |
| 2,010,310 | 8/1935 | Long ............ 174/72 TR X |
| 3,459,878 | 8/1969 | Gressitt et al. ............ 174/112 |
| 4,300,284 | 11/1981 | Reeder ............ 174/112 X |

FOREIGN PATENT DOCUMENTS 46-32630 9/1971 Japan ............ 174/72 A

OTHER PUBLICATIONS

Bell System Practices, Section 626.500.101, Issue A, Jul. 1978.
MS²3M Aderverbindungsleisten, Edition 2, Aug. 1977, EP.MS²-A.

Primary Examiner—Laramie E. Askin
Attorney, Agent, or Firm—Hill, Van Santen, Steadman & Simpson

[57] ABSTRACT

The individual wires of large capacity cables are held in predetermined spaced-apart positions by a device having dimensions suitable for insertion through conventional conduits. In one embodiment, a flexible support comprising a pair of tapes or the like secure the wires therebetween in areas which have aligned apertures so that access may be had to the wires for splicing connectors.

9 Claims, 22 Drawing Figures

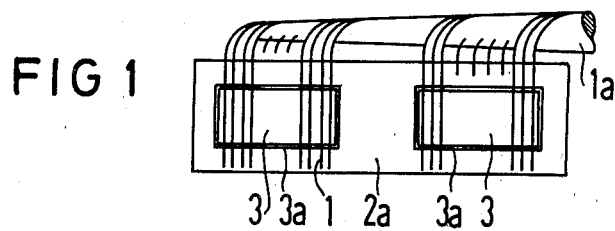
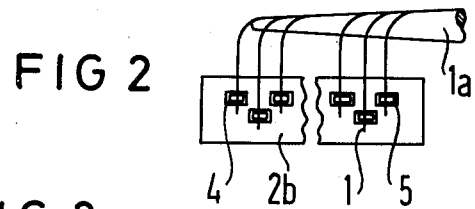
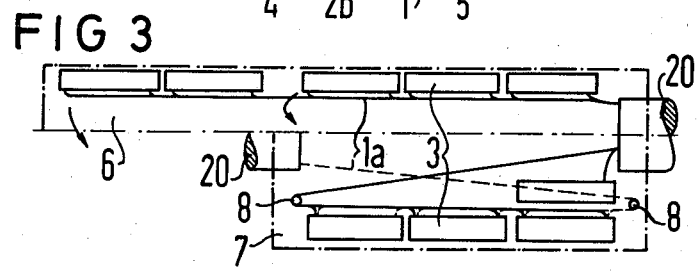
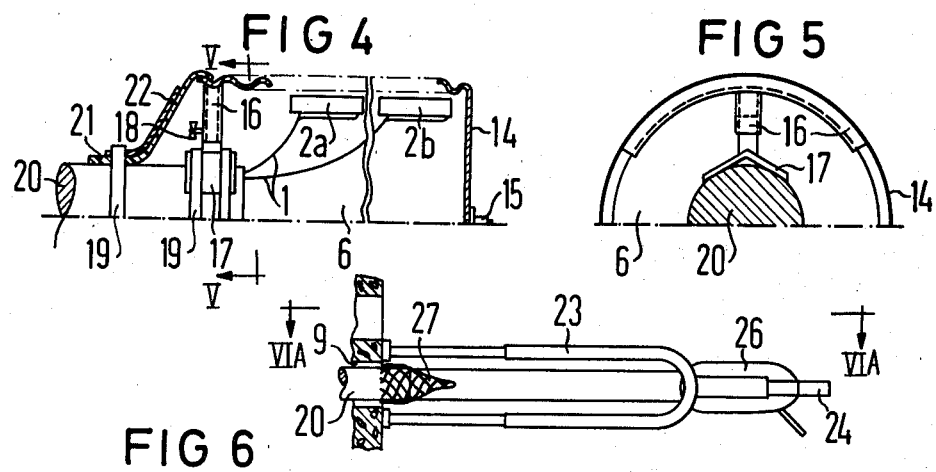
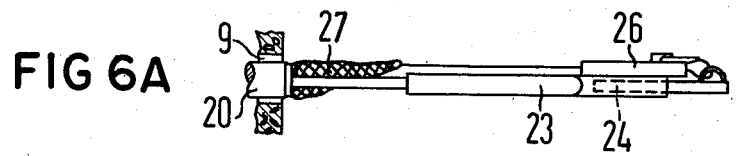

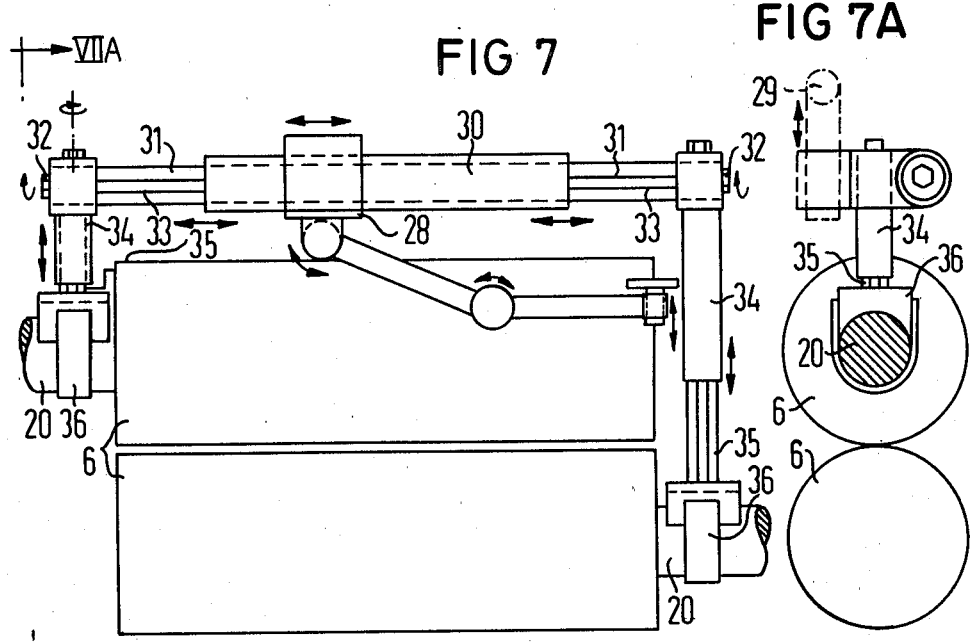
FIG 7
FIG 7A
FIG 8
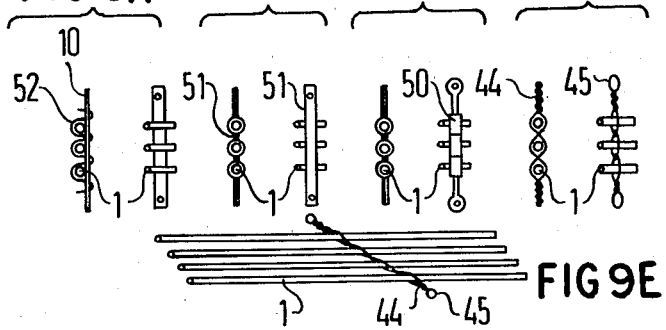
FIG 9A  FIG 9B  FIG 9C  FIG 9D
FIG 9E

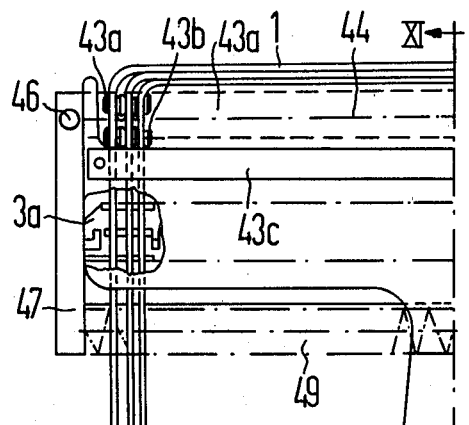
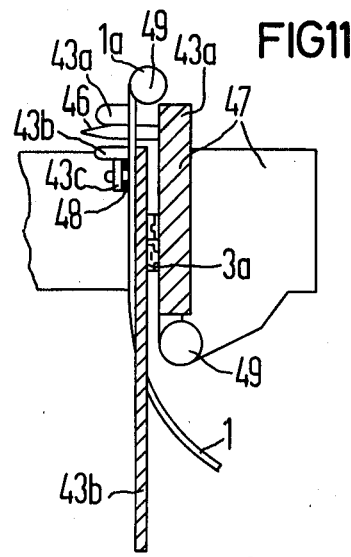
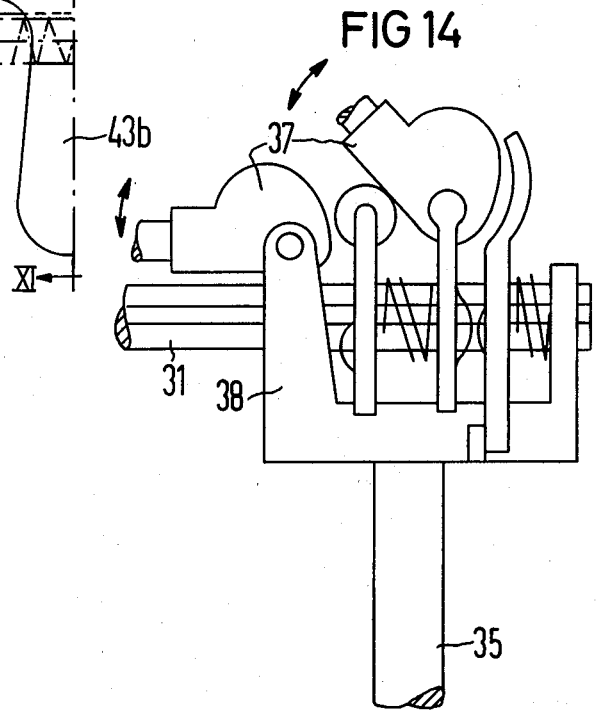
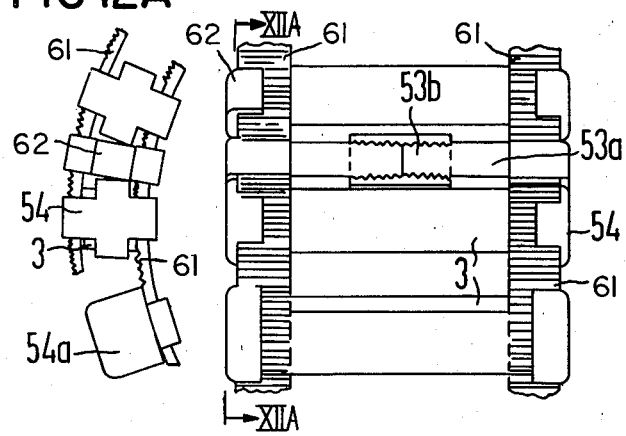
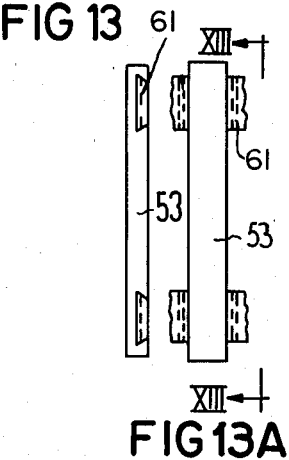

DEVICE AT CABLE ENDS TO SERVE AS A PREPARATION FOR SPLICING

BACKGROUND OF THE INVENTION

1. Field of the Invention

The present invention relates to devices at the ends of large-capacity cables, the wires of which are to be prepared in a factory in such a way as to determine their position for the purpose of time-saving splicing in cable installations.

2. Description of the Prior Art

In the installation of large-capacity cables, the splicing operations at the ends of the cables require a large amount of assembly time. Since these operations rise disproportionately in costs when the same last for more than a day in respect of each coupling box, it is particularly advantageous to make specific provisions prior to the installation of the cable. Technology of this kind has already been described in, for example, Bell System Practices, Section 626-500-101, Issue A, July 1978, fully incorporated herein by this reference, in which the large-capacity cables are equipped in the factory with wire connecting strips or wire support strips at one end, and are provided with the coupling box which is used later. The impermeability of the coupling box is subject to heavy requirements since the cables are filled with an internal pressure and both the cables and the coupling blocks are subjected to large mechanical stresses when inserted into a manhole.

However, coupling boxes of this type are very large and stiff, which means that special drums having lateral accommodation facilities for the boxes had to be provided for transport purposes. The installation of these prepared cables involves considerable difficulties as the cable ends, which have been prepared for splicing, cannot be inserted into a conduit. As a result, the cables which are to be installed can only be prepared for splicing at one end in the factory, whereas the second end cannot be assembled, accordingly, until following insertion. Therefore, only a few applications remain, for example installation in open trenches, in which preliminary splicing of both cable ends is possible.

SUMMARY OF THE INVENTION

The object of the present invention is to prepare the ends of large-capacity cables, with devices of the type described, in such a manner that the cable, which is to be transported on normal cable drums, can be inserted from both ends into conventional conduit, or, as a part of this requirement, the devices must by virtue of their design contribute to the simplification and time saving in the splicing operations.

The above object is achieved, according to the present invention, in that flexible supports are provided for the formed-out wires of the cable which are fixed in the combination which will later be required, and that the overall dimensions of the supports, each arranged at one cable end, are such that the same can be inserted into conventional cable conduit.

In the devices constructed in accordance with the present invention, it is of particular advantage that the dimensions of the transport coupling boxes to be provided for the ends of the cables can be kept very small in diameter, thereby facilitating adaptation to standardized cable drums. Here, the formed-out wires of the cables are arranged and fixed in such a way that their later location for splicing at the assembly location is predetermined and suitably adapted. These cable wires are fixed, for example, in stretch-proof, flexible strips which can extend right to the end of the cable in order to transmit the insertion forces from the pulling cap to the cable wires. This ensures mutual positioning.

A further simplification in the space requirement is achieved in that these devices can also be arranged in series with one another by appropriate folding of the wires in the eventual coupling box. These arrangements can be extremely space-saving so that the devices can be inserted into relatively small protective or transport coupling boxes. This enables the use of normal cable drums. These tubular boxes also permit insertion into conventional cable conduit so that the cables need no longer be installed in a direction-dependent fashion.

An additional improvement is achieved by the use of flexible structures for the coupling box, which are manufactured, for example, from a corrugated tube or a thin-walled sprayed-on synthetic coating which is reinforced by glass fibers and increased in diameter. The already-inserted cables can now easily be equipped with wire connecting strips, since a particular simplification is provided by the fact that the orientation and fixing of the wires in the flexible holders have already been predetermined in the factory. Prior to the equipping of the wire ends with the wire connecting strips, a support device can be arranged at the cable ends which are to be connected which allows the same a reduction in the adjustment expense, without the use of force, in order to position the two cable ends opposite one another with accuracy within a few millimeters. When the cables are now inserted, any differences between the planned location of the coupling boxes and the true position of the boxes can be corrected by a cable drawing device. However, here it is particularly important that the requisite pulling of the cable out of the conduit can be ensured, even when a pulling lug is not provided in the manhole. In order to be able to prepare cables for splicing at the factory, also at the ends which are to be inserted, with no or only a slight increase in diameter, in place of the usual provision of wire connecting strips, the individual strand elements of the cable are simply divided and fixed in position during dispatch, whereas at the assembly location they are formed out by a forming out device for the application of the wire connecting strips. This automatically dispenses with dependency upon the drawing direction in the case of symmetrical cables. The supports for the wires, in particular when strips are used, can now extend to a notch arranged at the end of the cable and can be connected thereto in a stretch-proof manner, whereby the tension force which acts upon the notch for the insertion of the cable can be transmitted to the wires. As a result, the cable sheath is no longer subjected to such high stress during the insertion process. This results in the attainment of the full installation properties of a cable which has not been prepared at the factory. In order to be able to reduce the dependency of the stock length upon the requisite cable length, division by forming-out devices is effected at specific intervals at both ends without breaking the unity of the strands.

Advantages of the factory preparation of the ends of large capacity cables which cannot normally be connected in one day consist both in facilitating connection within a day, and also of avoiding mis-splicing as a result of the factory control, together with the associated high cost fault finding and fault elimination. In order to achieve this target, it is unnecessary to equip the divided wires with wire connecting strips actually in the factory, as is currently being effected, since the placing of the wire connecting strips on divided or pre-formed wires occupies only a small proportion of the time. In accordance with the invention, it is now possible to simplify the forming out of the wires, which have already been divided at the factory, in such a manner that even in the case of large-capacity cables, the requisite time expense permits connection to be effected within a day. Therefore, the ends of these cables can be sealed in such a manner that they do not differ in respect of their installation properties from non-prepared cables. The only difference is that in the case of "tube cables" the match lengths must be measured with a greater accuracy than usual. Therefore, the scope of the invention extends to the installation of large-capacity cables having ends prepared for splicing, and these measures enable the use of special cable drums to be abandoned without impairing the facility of installation.

BRIEF DESCRIPTION OF THE DRAWINGS

Other objects, features and advantages of the invention, its organization, construction and operation will be best understood from the following detailed description, taken in conjunction with the accompanying drawings, in which:

FIG. 1 illustrates formed-out wires of a cable in support and arrangements in accordance with the present invention;

FIG. 2 illustrates formed-out wires of cable in supports and another embodiment of the invention;

FIG. 3 illustrates formed-out wires of a cable in supports and another embodiment of arrangements constructed in accordance with the invention;

FIG. 4 is a sectional view of the arrangements of the types illustrated in FIGS. 1–3 within a transport box;

FIG. 5 is an internal view of the apparatus of FIG. 4 in the viewing direction V—V;

FIGS. 6 and 6A are respective top and side views of a device for adjusting an inserted cable, with FIG. 6A viewed in the direction of the section line VIA—VIA;

FIG. 7 is a lateral view of a device for aligning the ends of two cables which are to be connected;

FIG. 7A is a view of the device of FIG. 7, as seen in the direction VIIA—VIIA;

FIG. 8 is a fragmentary view of an auxiliary device which serves to protect the cable in the event of considerable deflection;

FIGS. 9A–9D illustrate four further embodiments of supports constructed in accordance with the invention, as seen in two directions;

FIG. 9E is a perspective view of the embodiment illustrated in FIG. 9D;

FIGS. 10 and 11 illustrate a splicing head in which the formed-out wires which have been fixed in accordance with the invention are spliced, FIG. 11 being viewed in the direction XI—XI of FIG. 10;

FIGS. 12, 12A, 13 and 13A illustrate an arrangment of the cable splice effected at the cable ends, with FIG. 12A being an end view of the arrangement of FIG. 12 as viewed in the direction XIIA—XIIA and FIG. 13 being an end view of FIG. 13A as seen in the direction XIII—XIII; and FIG. 14 illustrates an alternative construction of the alignment device illustrated in FIG. 7.

DESCRIPTION OF THE PREFERRED EMBODIMENTS

FIG. 1 illustrates the use of flexible supports in the form of two stretch-proof flexible strips 2a which are glued or welded to one another and between which the wire ends 1 of a group 1a of wires are immovably fixed. The strips possess apertures 3a across which the formed-out or fanned and bent wire ends 1 are drawn. The top strip 2a has been removed for this showing. Later, during the splicing process, the appropriate wire connecting strips 3 are inserted into these open portions. The wire connecting strip 3 is applied from both sides and is closed by being pressed. The projecting strips 2a, which under certain circumstances are provided with a perforation, can be cut off following the splicing process. In this exemplary embodiment, the strip 2a is simultaneously employed to fix the interval between adjacent groups of wires and its extension is used to transmit tension forces from the tip of the cable to the wire 1. This also ensures the intervals between the wire connecting strips which are to be applied later.

FIG. 2 illustrates a strip 2b having a similar construction and identical fixing of the wires 1 as in the case of the strip 2a of FIG. 1, although it corresponds only to the region of one wire connecting strip and does not exceed the contours of such wire connecting strip. The wire ends 1 have already been cut to the correct length and the strip 2b includes recesses 5 in the region of the later strip contacts 4.

The advantages of the above constructions lie in improved facilities for matching the strips 2a and 2b to the space conditions within a coupling box in comparison to earlier wire connecting strips or wire support strips. This allows a reduction in the diameter of the transport box, as indicated in FIG. 3. This also favors the use of synthetic sheath cables having prepared wire ends in metal fittings, for example coil boxes, because in these cases the cable must be threaded through solderable metal reducing pipes or adaptor pipes. The reduction in the diameter of these transport boxes 6 is achieved in that the formed out, divided, or pre-spliced wire end groups 3 are accommodated over a longer length. The accommodation of the associated larger supply of wire lengths does not require a larger box, provided the guidance and accommodation in the slicing area is effected in accordance with a predetermined system adapted to the size and type of box. During assembly, the group of wires 1a which project beyond the length of the splice box 7, which is to be used later and has only been indicated by dot-dash lines in FIG. 3, are withdrawn in accordance with their marks and under extreme circumstances even folded twice. To enable the group of wires 1a to be folded at their folding location with the smallest space requirement and without any danger of damage, here the use of a bending clip 8 is provided at two locations which permits a smaller bending diameter in that the strand elements of a group of wires are arranged one beside another. A bending clip of this type fundamentally consists of a channeled mandrel in the channels of which the individual strand elements are inserted. Following the insertion of the strand elements into the channels, an elastic and slotted sleeve is applied so that the strand elements are fixed in their positions.

FIGS. 4 and 5 illustrate a flexible, pressure-tight transport box 6, which in part can be re-used. The box comprises a dome 14 in the form of a corrugated tube at one end of which can be arranged a valve 15 in order, for example, to be able to monitor the internal gas pressure. The actual force produced by the inner gas pressure is fixed and accommodated by means of clips 16 of corrugated tube formation arranged on the outside and which can slide into position onto prism-like cable clips 17. With their corrugated tube-like exterior, the clips engage in form-locking fashion into the profile of the outer dome 14 whereby they are axially fixed. The clip 16 and the cable clip 17 can be mutually fixed by a fixing screw 18 when they have been positioned in the dome 14. The cable clips 17 can be attached to the cable 20 by commercially available clamps 19. Sealing vis-a-vis the cable 20 can be effected with a shrink tube 21 which can also comprise a detachable support 22 fixed by a clamping strip 19 in order to acquire rigidity vis-a-vis the internal pressure. Within the transport box 6, the accommodation of the wire ends 1 with the corresponding supports 2a, 2b in accordance with the invention has been indicated.

FIGS. 6 and 6A illustrate, in two views, a device with the aid of which the accurate positioning of the cable end and the cable box is effected. Cable which has been inserted too far is then brought into the requisite position with the aid of this device from the box location, whereas cable which has not been inserted sufficiently far is adjusted from the next manhole. Since this adjustment does not relate to an entire length of lay, but only to a partial length to the next manhole, the cable can be directly gripped on its sheath, since the sheath stability is sufficient for the tension forces needed for this operation. For simplicity, the device has merely been represented on a cable 20 which is just projecting out of the cable drawing tool 9. The device comprises a double, longitudinally-adjustable shackle 23 including an extendable arm 24, at the end of which is laterally arranged a lug for the suspension of a commercially-available drawing element 26 such as, for example, a gripping and pulling device, pulling lifter, pulley block and the like. The transmission of tension force to the cable 20 here is effected with an open cable grip 27. If a protective box in accordance with the invention is arranged at the end of a cable, the cable can be gripped behind the box by a clip or the like. Another method of transmitting tension to the cable 20 consists, for example, of using a form of lever shears wherein the tension force originating from the traction rope is transferred to the cable as a pressure force via lever elements. Slipping on the cable prior to the tension force taking effect can be prevented by means of corresponding springs on the central articulation. For regripping, it is merely necessary to overcome the spring force by raising the lever.

FIGS. 7 and 7A illustrate a splicing aid for splice-correct shaping and alignment of the cable ends. This represents a realization comprising an assembly shackle which is adjustable in the longitudinal and lateral directions and which permits the cable ends which are to be connected, which prior to the start of assembly are arranged beside or above one another in an overlapping fashion with their domes or transport boxes 6 to be gripped and by means of longitudinal or transverse adjustment, following the removal of the protective boxes, to be automatically brought into the position most favorable for splicing with the least possible exertion of force. Furthermore, by means of additional devices 28, the assembly shackle can also be used to temporarily receive devices for the support, forming out, and splicing of the wires. If, as illustrated in FIG. 7A, it is provided with feet 29 which are adjustable in height, this device can also be used in underground boxes. When appropriately designed, it can also be used for attachment to cable holders. The assembly shackle comprises a central pipe 30 in which two adjustable pipes 31 automatically slide away from one another or towards one another depending upon the direction of rotation when the spindles 32 are rotated. The pipes 31 are prevented from rotating by means of grooves 33. A pair of pipes 34 and 35 have similar adjustment facilities and rotation safeguards. At the lower end of the pipe 35, the cables 20 with their transport boxes 6 are fixed in direction and spacing from one another by way of known prismatic quick-acting clamps 36. In FIG. 7A, the side view additionally illustrates the position of the two transport boxes relative to one another, and as an addition, here, the foot 29 which is adjustable in height is attached to the assembly shackle by means of a clamping connection. The arrows and double-headed arrows illustrated in FIGS. 7 and 7A indicate the possible directions of movement in which the transport boxes 6 can be moved until they agree in location.

A device, similar to that illustrated in accordance with FIG. 7, for aligning the cable ends and the transport boxes 6 is shown in FIG. 14. Here, the adjustment devices having the spindles 32 are replaced by a lever system operating in accordance with a known lifting jack system. FIG. 14 illustrates only one of these adjustment possibilities as the principle of the device is always the same. The two pipes 31 and 35 on which the adjusting device 38 is arranged have been illustrated as orienting features. This adjustment device 38 slides on the pipe 31 when one of the levers 37 is actuated by being turned in the direction of the arrow. The adjustment device 38 is prevented from rotating by a projection which engages into a groove (as the groove 33 in FIG. 7). A similar adjusting device 38 is arranged on the perpendicular pipe 35 in the same manner, so that displacement is also possible in this direction. It should also be added that the transport boxes 6 (FIG. 7) can under certain circumstances be replaced by appropriate widening of the cable sheath at the end of the cable in the region of the exposed wires 1 which are fixed by means of the strips 2a or 2b. This form of protection for the wires results in a considerable economy of material and likewise assembly costs.

When large-capacity cables are deflected in narrow manholes, a danger exists that the cables will bend at the deflection points, in which case a fold formation may also appear. FIG. 8 illustrates a bend protection device 40 which is preferably manufactured as a cast component from thermoplastic material. The bend protection device 40, which must be rigidly attached to the cable 20 on the inside of the intended curve prior to the bending, prevents the described disadvantages in the event of narrow curves so that the possible bending radii can be used without danger to the cable. This is particularly advantageous when such is necessary for the positioning of the cable ends which have been prepared in the factory. For better matching to the cable 20, advantageously the radial and axial ends of the bend protection device 40 are tapered. The fixing to the cable is effected either by integral buckles 41 or commercially available clamps 42. The dash-dot line indicates a possible bending radius for the installation of the cable 20.

FIGS. 9A–9E illustrate further embodiments of the invention. In these cases, the wires 1 of the cable which has been prepared for splicing in the factory are introduced into supports which have the form of tear-resistant filaments 44 arranged in a chain (FIG. 9D), juxtaposed synthetic sleeves (FIG. 9C), synthetic strips 51 welded to one another in the gaps therebetween (FIG. 9B) or a carrier strip 10 (FIG. 9A) upon which a filament 52 is sewn in the form of a loop. The wires 1 extend at a distance from one another in the resultant loops or openings. In order to facilitate splicing, lugs 45 or similar elements with holes are arranged at the edges of the assembled groups of wires for attachment to a splicing head. These supports are, in accordance with the invention, arranged at the ends of the cables in the factory so that the cables are dispatched with their ends prepared for splicing and can be drawn into the cable lines. Preparation of this kind has the further advantage that the individual wires can be fixed on the supports, which are referred to as division devices, in a numerical sequence. This division device is not to be substantial as far as possible, and is to conduct the wires at their latest spacings. If necessary, it is also to be able to be arranged on a group of strands which at this stage is not divided.

The splicing operations at the assembly location can be simplified and shortened with these supports for the wires 1 which have been applied in the factory, in accordance with the invention, in an advantageous manner by means of commercially-available splicing aids, for example, a splicing head manufactured by the company 3M Deutschland GmbH (Information und Arbeitsanleitung: MS$^2$ 3M Adernverbindungsleisten, Edition 2, August, 1977, EP-MS$^2$-A). FIGS. 10 and 11 illustrate a portion of such a splicing head 47 with such details as are of interest here. Therefore, the supports ccontructed in accordance with the invention, for example the tear-resistant filaments 44 with the wires held therein, are each provided with the above-described lugs 45 in order to facilitate tightness and suspension in hooks 46 of the splicing head 47 of the above-described type. In this manner, it is possible to introduce and position the wires in a rational form in the gaps of a two-part division comb 43a and 43b. The second portion of the division comb 43b which is arranged in the splicing head 47 can be withdrawn from the fixed portion 43a following the action of a retaining device 43c, and in this manner the wires 1 can be inserted in the gaps of the underlying lower portion of the wire connecting strip 3a. The hooks 46 and the dividing combs 43 would have to have been applied to the commercially-available splicing heads. The retaining device 43c is advantageously coated with elastic material 48 (FIG. 11) on the side facing toward the wires 1. The wire ends can be inserted, as desired, into a support, such as a wire support spring 49, and the mobile comb section 43b can be reused to follow the removal of the retaining device 43c and the application of the central portion of the wire connecting strip for the positioning and insertion of the corresponding wires. The mobile comb section 43b can also remain in its end position and the second group of wires 1a can be positioned, guided and inserted by a second mobile comb section 43b and retaining device 43c. Which of the indicating supports is selected for the positioning of the wires is irrelevant as regards the principle of the invention. It is also irrelevant whether this division device is applied to the group of wires prior to the stranding to form the cable core or thereafter. It is advantageous to mark the position of the box, determined by the position of the division device, actually on the cable sheath. Furthermore, it is also possible to arrange such devices several times, in series, at the cable ends in order to reduce the dependency of the cable length and the cable ends upon the location of the box.

FIG. 11 is a side view of the splicing head 47 with the wire support spring 49 by way of which the wires 1 are supported. Also shown is a hook 46 into which the described lugs 45 of the supports of the invention can be suspended.

FIGS. 12, 12A, 13 and 13A illustrate how, in the case of large capacity cables, it is possible for the wire connecting strips 3, which can otherwise be grouped only with a large expense and skill, to be uniformly distributed over the cable splice. An additional advantage resides in the fact that with this method the wires 1 are exposed to less danger of damage. The wire connecting strips 3 are fixed by means of two longitudinally-divided rings which, on the completion of the splice, are positioned about the splice at intervals corresponding to the length of the wire connecting strips, and are locked in position. As shown in FIGS. 13 and 13A, each ring comprises two similar, externally grooved synthetic strips 61 of trapezoidal cross-section which are cut to length at the assembly location in accordance with the spliced diameter and having been positioned around the splice are connected with, for example, U-shaped cast components as connecting elements to form a ring. The rings are each positioned at the end of the wire connecting strips by engaging trapezoidal grooves in the spacing elements 53. The wire connecting strips are inserted between the rings in an oblique position, are rotated into the cable axis, and are brought into their final position at the periphery where they are positioned by laterally placing the supports 54 which can be anchored in the grooves of the synthetic strips 61. Another possibility of positioning the wire connecting strips 3 is indicated by the support 54a. Here, the external ring is omitted and the support 54a is attached to the inner ring 61. The rings can be spaced by a U-shaped support 62, in which case the lateral edges are impressed into the grooves of the synthetic strip 61. In order possibly to facilitate assembly, this can also be effected with two U-shaped supports 53a which likewise laterally engage into the grooves in the synthetic strips 61 and which are then additionally connected in the center to an attachable connector 53b and are locked in position.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In combination, a large capacity cable including two cable ends and a plurality of wires extending between said ends; and at one of said ends, a device for holding the ends of the wires, including
at least one flexible support including means for receiving and holding the ends of the wires in a predetermined relationship, said support having dimensions for insertion into conventional conduits, said support comprising a pair of stretch-proof flexible strips areally connected together and holding the wire ends immobile therebetween, a housing connected to said end of said cable and providing strain relief, and said flexible strips located within and connected to said housing in a stretch-proof manner.

2. The combination of claim 1, wherein: said housing is a coupling box adapted to receive another cable.

3. The combination of claim 1, wherein: said housing is a protective cap comprising a corrugated tube which is axially flexible.

4. The combination of claim 3, wherein: said corrugated tube is supported on said cable at a point radially outward of said cable and said cap further comprises a tapered tube connecting said corrugated tube to said cable.

5. In combination, a large capacity cable including two cable ends and a plurality of cable wires extending between said ends; and at one of said ends, a device for holding the ends of the wires, including
at least one flexible support means receiving and holding the ends of said wires in a predetermined spacing, said support means having dimensions to be received through a conventional conduit; and
conductor connection means connected to said wires for connecting said wires to the wires of another cable, said conductor connection means including a plurality of strips connected to said wires, and a pair of spaced apart rings mounting said strips.

6. A combination of a cable having a plurality of wires and a device for holding the ends of the wires, comprising:
a pair of flexible support strips bonded together with the ends of the wires sandwiched therebetween and held in a predetermined spacing, said flexible support strips each including aperture means defining apertures through said strips in the area of the wires for access to the wires, each aperture exposing a plurality of the wires, so that connecting means may be applied on both sides of said joined strips and pressed together to connect to the wires, said support strips having dimensions for insertion into conventional conduits.

7. The combination of claim 6, wherein: each of said flexible support strips is a stretch-proof flexible support strip.

8. In combination, a large capacity cable including two cable ends and a plurality of wires extending between said ends; and at one of said ends, a device for holding the ends of the wires, including
at least one flexible support including means for receiving and holding the ends of the wires in a predetermined spaced relationship, said support having dimensions for insertion into conventional conduits,
said support comprising a pair of stretch-proof flexible strips areally bonded together and holding the wire ends immobile therebetween, said flexible strips including a pair of aligned apertures in the areas of said wires for access to said wires, and
each of said wires being exposed by a respective pair of said apertures.

9. In combination, a large capacity cable including two cable ends and a plurality of wires extending between said ends; and at one of said ends, a device for holding the ends of the wires, including
at least one flexible support including means for receiving and holding the ends of the wires in a predetermined spaced relationship, said support having dimensions for insertion into conventional conduits,
said support comprising a pair of stretch-proof flexible strips areally bonded together and holding the wire ends immobile therebetween, said flexible strips including a pair of aligned apertures in the areas of said wires for access to said wires, and
each pair of said aligned apertures exposing a respective plurality of said wires.

* * * * *